(12) United States Patent
Bardon et al.

(10) Patent No.: US 7,174,708 B2
(45) Date of Patent: Feb. 13, 2007

(54) METHOD FOR MANAGING PARTICULATE FILTER BACKWASHING MEANS

(75) Inventors: Sebastien Remi Bardon, Lyons (FR); William Pierre Mustel, Montmorency (FR)

(73) Assignee: Saint-Gobain Centre de Recherches et d'Etudes Europeen, Courbevoie (FR)

( * ) Notice: Subject to any disclaimer, the term of this patent is extended or adjusted under 35 U.S.C. 154(b) by 0 days.

(21) Appl. No.: 10/503,307

(22) PCT Filed: Feb. 5, 2003

(86) PCT No.: PCT/FR03/00355

§ 371 (c)(1),
(2), (4) Date: Aug. 3, 2004

(87) PCT Pub. No.: WO03/067048

PCT Pub. Date: Aug. 14, 2003

(65) Prior Publication Data

US 2005/0115228 A1 Jun. 2, 2005

(30) Foreign Application Priority Data

Feb. 5, 2002 (FR) .................................. 02 01340

(51) Int. Cl.
*F01N 3/10* (2006.01)
(52) U.S. Cl. ............... 60/303; 60/274; 60/295; 60/297; 60/300; 60/311
(58) Field of Classification Search ............... 60/274, 60/295, 297, 300, 311, 303; 55/282.2, 282.3, 55/385.3, DIG. 10, DIG. 30
See application file for complete search history.

(56) References Cited

U.S. PATENT DOCUMENTS

| 4,205,363 | A | * | 5/1980 | Boos et al. ................. 361/264 |
| 4,424,671 | A | | 1/1984 | Tokura |
| 4,503,672 | A | * | 3/1985 | Stark et al. .................... 60/286 |
| 4,505,107 | A | * | 3/1985 | Yamaguchi et al. .......... 60/303 |
| 4,531,363 | A | * | 7/1985 | Ludecke et al. ............... 60/303 |
| 4,549,398 | A | | 10/1985 | Takama et al. |
| 5,042,249 | A | * | 8/1991 | Erdmannsdoerfer ......... 60/299 |
| 5,287,698 | A | | 2/1994 | Kanesaki et al. |
| 5,786,565 | A | | 7/1998 | Bateman et al. |
| 6,028,292 | A | | 2/2000 | Willkens et al. |
| 6,474,492 | B1 | * | 11/2002 | Willkens et al. ............. 215/270 |
| 6,989,048 | B2 | * | 1/2006 | Bardon et al. ................. 95/278 |

FOREIGN PATENT DOCUMENTS

| EP | 0 669 828 | 3/1996 |
| EP | 0 859 132 | 8/1998 |
| FR | 2 771 449 | 5/1999 |
| FR | 2 774 421 | 8/1999 |

OTHER PUBLICATIONS

Robert Bosch GMBH: "kraftfahrtechnisches Taschenbuch", 1995, VDI-VERLAG, DUSSELFORF XP002242360 p. 538-p. 540.

* cited by examiner

*Primary Examiner*—Thomas Denion
*Assistant Examiner*—Diem Tran
(74) *Attorney, Agent, or Firm*—Young & Thompson

(57) ABSTRACT

A method is provided for backwashing, by heating, a particulate filter to be purified of exhaust gases (G) of an internal combustion engine (M), in particular an internal combustion engine equipping a motor vehicle (V). The method includes controlling the start-up of a device for heating (1) the filter (F) when the engine (M) delivers an engine torque at a predetermined low threshold ($C_{bas}$).

22 Claims, 1 Drawing Sheet

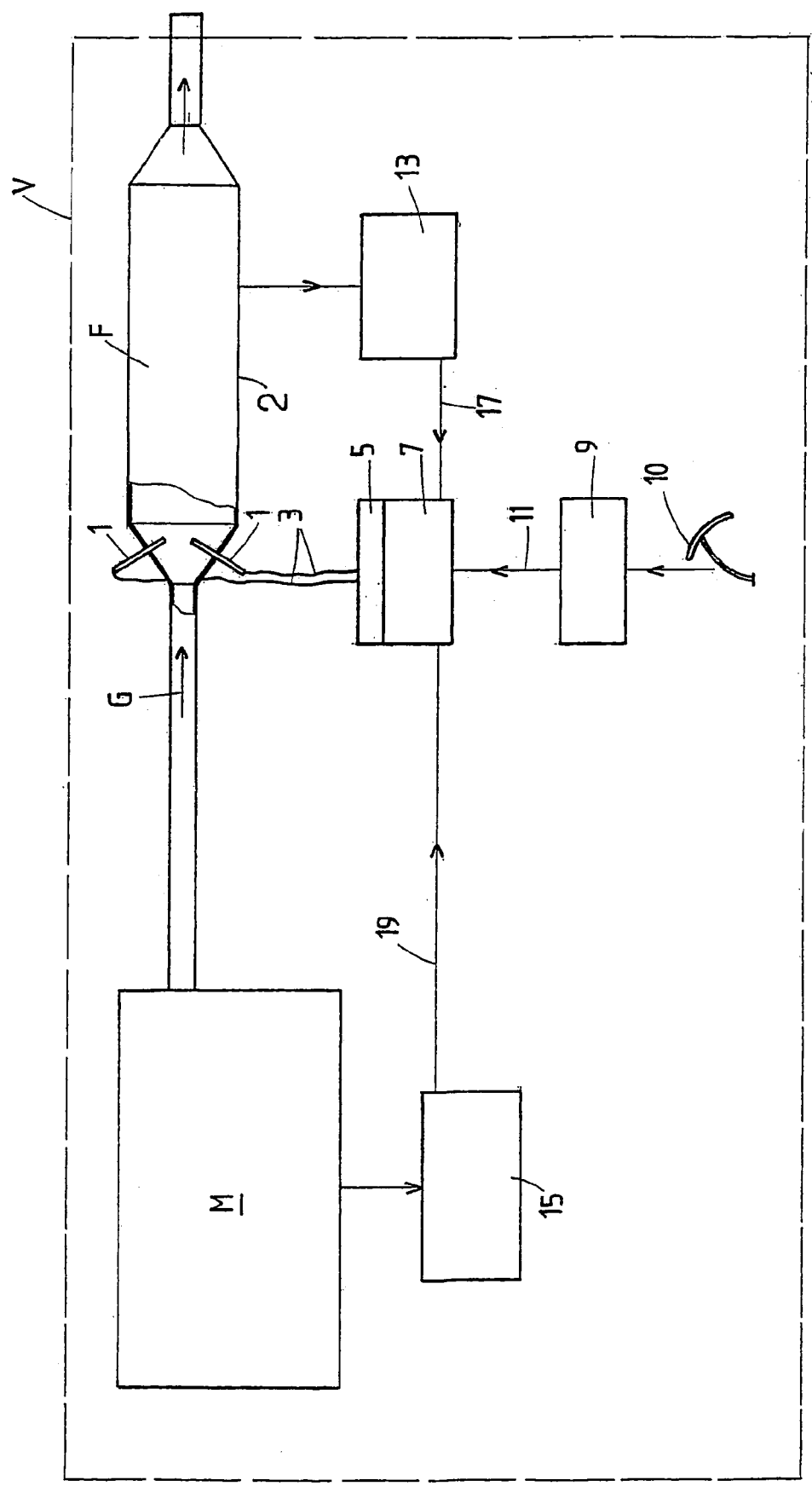

METHOD FOR MANAGING PARTICULATE FILTER BACKWASHING MEANS

BACKGROUND OF THE INVENTION

The present invention relates to a method of backwashing, by heating, a particulate filter adapted to purify exhaust gases from an internal combustion engine, in particular an internal combustion engine equipping an automobile vehicle.

DESCRIPTION OF THE RELATED ART

A particulate filter conventionally comprises honeycomb porous structures forming filter bodies for filtering particles emitted by diesel vehicles. These filter bodies are generally made of ceramics (cordierite, silicon carbide, etc.). They may be of one-piece construction or consist of various units. In the latter case, the units are assembled by bonding them together with a ceramic cement. The resulting assembly is then machined to the required cross section, which is generally round or oval. The resulting filter body may comprise a plurality of passages, closed at one end or the other, which may have cross sections with different shapes and diameters. The filter body is generally inserted into a metal enclosure, for example as described in FR-A-2 789 327.

In use, soot accumulates in the passages of the filter body, in particular in the inlet passages, which increases the head loss caused by the filter body and therefore degrades the performance of the engine. For this reason, the filter bodies must be regenerated regularly, for example every 500 kilometers.

Regeneration, also known as "backwashing", consists in oxidizing the soot. It is necessary to heat the filter to achieve this. The flash point of soot is of the order of 600° C. under standard operating conditions but the temperature of the exhaust gases is on average only of the order of 300° C. However, it is possible to add additives to the fuel to catalyze the soot oxidation reaction and reduce the flash point to approximately 150° C.

The exhaust gases or the filter body may be heated, or the soot may be heated directly. Different techniques have been developed.

One recent approach is local heating, on the upstream side of the filter body, in such a manner as to initiate combustion, which then propagates progressively into the whole of the filter body. This type of technique is described in FR A 2 771 449 and DE-A-19530749, for example.

The heating means are generally connected to an electrical power supply of the vehicle.

They may comprise ceramic plugs, for example diesel engine glow plugs, simple electrical elements, or ceramic igniters, as described in French patent application No. 0013998 filed Oct. 31, 2000 by the Applicant.

The engine operating conditions may vary considerably between starting the regeneration process, i.e. turning on the heating means, for example the ceramic igniters, and the moment at which the soot actually ignites. Variation in operating conditions can greatly degrade efficiency.

SUMMARY OF THE INVENTION

The object of the invention is to provide a backwashing method that limits the degradation of the efficiency of regeneration of the filter.

The above object is achieved by a method of backwashing by heating a particulate filter for purifying exhaust gases from an internal combustion engine, in particular an internal combustion engine equipping an automobile vehicle, noteworthy in that starting of the heating means for the filter is commanded when said engine is delivering an engine torque below a predetermined bottom threshold.

It has been found that, under these engine operating conditions the ignition of the soot accumulated in the filter body of the filter and the propagation of the combustion of the soot are not greatly influenced by the engine operating conditions. Thus by controlling the heating means in accordance with the invention, efficient regeneration of the filter is achieved, substantially independently of variations in the engine operating conditions.

Thus the starting of said heating means is preferably commanded only if the engine is delivering an engine torque below said low threshold.

According to other features of the invention:

starting of said heating means is commanded when said engine is idling or in the absence of combustion in said engine;

said bottom threshold is less than or equal to 10% of the maximum engine torque of said engine;

starting of said heating means is commanded after said engine has delivered an engine torque exceeding a top threshold for at least a predetermined time period;

said top threshold is greater than or equal to 30% of the maximum engine torque of said engine;

said predetermined time period is greater than or equal to one minute;

starting of said heating means is commanded only if said filter and/or said engine are at temperatures exceeding respective threshold temperatures;

starting of said heating means is commanded after detection of a minimum mass of soot in said filter;

starting of said heating means is commanded at the latest one minute after said engine has begun to deliver an engine torque below said bottom threshold;

starting of said heating means is commanded as soon as said engine has begun to deliver an engine torque below said bottom threshold;

said heating means are maintained in operation for at least five seconds after starting;

said engine torque delivered by said engine is evaluated by measuring a position of an accelerator pedal;

said heating means comprise a hot tip whose temperature increases from a temperature greater than or equal to 20° C. to a temperature greater than or equal to 1000° C. within six seconds of being started;

said heating means comprise Mini-Igniter® type igniters.

The invention also provides a device for implementing the above backwashing method, said device comprising heating means for heating said filter, control means for controlling said heating means, and a computer for managing said control means.

The device is noteworthy in that it further comprises detection means for detecting the delivery by said engine of an engine torque below a predetermined bottom threshold, said computer commanding starting of said heating means in response to said detection.

According to other features of the device of the invention:

said heating means are adapted to heat by direct contact particles deposited on a filter body of said filter;

said heating means comprise at least one ceramic igniter;

hot tips of said heating means are disposed inside said filter body or on an outside lateral surface of said filter body, preferably without projecting from said surface;

the device includes detection means for detecting rotation of said engine.

BRIEF DESCRIPTION OF THE DRAWING

Other features and advantages of the present invention will become apparent on reading the following description and from the appended drawing in which the single FIGURE is a diagrammatic representation of a device constituting a preferred embodiment of the invention.

DESCRIPTION OF THE PREFERRED EMBODIMENTS

The device of the invention represented in FIG. 1 comprises ceramic igniters 1 disposed in such a manner as to be able to heat a particulate filter F for purifying exhaust gases G from an internal combustion engine M of a vehicle V.

The ceramic igniters may equally be disposed in such a manner as to heat the gases G or to heat the soot directly.

The ceramic igniters 1 are small components which, when an electrical current flows in them, are locally heated to a very high temperature (1200 to 1400° C.). These igniters are usually made of a highly resistive ceramic material such as silicon carbide, sometimes mixed with other ceramic components.

The ceramic igniters are preferably those described in U.S. Pat. Nos. 5,085,804 and 5,045,237.

The igniters described in U.S. Pat. No. 5,085,804 comprise a hot region consisting primarily of a sintered mixture of 5 to 50% by volume of molybdenum disilicide and 50 to 95% by volume of a mixture of silicon carbide and silicon nitride.

The open pore content is less than or equal to 4% and the bending resistance at the standard threshold is at least 207 MPa (30 000 psi).

The ratio between the resistivity at room temperature and the resistivity at 1200° C. of the igniters described in U.S. Pat. No. 5,085,804 is less than 19.8, but may be as low as 0.2. A ratio of this magnitude indicates a very short response time, the response time varying in the same direction as this ratio.

The hot region of the igniters described in U.S. Pat. No. 5,085,804 may be defined as follows:

(1) Thickness or width of at least 0.0508 cm (0.020 in) or cross section area of at least 0.00258 cm² (0.0004 in²).

(2) Thickness or width of at most 0.127 cm (0.050 in) or cross section area of at most 0.0161 cm² (0.0025 in²).

(3) For narrow cross sections, hot region lengths at most approximately 2.53 cm (1 in), the length/area ratio being at most approximately 2500 to 0.0258 cm² (0.004 in²).

(4) For short, fat shapes, a hot region length of at least 0.508 cm (0.2 in).

The igniters described in U.S. Pat. No. 5,045,237 have a hot region consisting primarily of a sintered mixture of 5 to 50% by volume of molybdenum disilicide and 50 to 95% by volume of a mixture of silicon carbide and aluminum nitride. The other features and performance of these igniters are similar to those of the igniters described in U.S. Pat. No. 5,085,804.

Detailed information on the structure and the fabrication of the ceramic igniters may be found in NORTON COMPANY's U.S. Pat. Nos. 5,191,508, 5,085,804, 5,045,237, 4,429,003 and 3,974,106.

The ceramic igniters 1 are preferably disposed to heat particles deposited on a filter body of the filter.

The hot tips of the ceramic igniters 1 are preferably inside the filter body of the filter F, the ceramic igniters being pushed wholly or partially into the filter body.

This has the advantage of enabling efficient transmission of heat energy to the soot accumulated in the filter body of the filter F.

In one variant of the invention, the ceramic igniters are on the substantially cylindrical outside lateral surface 2 of the filter body, and are preferably pushed into housings, which are preferably of complementary shape, formed in the surface 2. The shape of the housings is preferably determined so that the igniters do not project from the surface 2.

For more detailed information on the disposition of the ceramic igniters see French patent application No. 0013998.

However, the invention is not limited to heating through direct contact of the heating means with the particles of soot. The exhaust gases or the filter body may be heated.

The ceramic igniters 1 are connected by electrical wires 3 to control means 5 adapted to supply them selectively with an ignition electrical current.

According to the invention, this device further comprises a computer 7 for managing the control means 5 and evaluation means 9 for evaluating the engine torque delivered by the engine M, for example by measuring the position of an accelerator pedal 10.

The evaluation means 9 for evaluating the engine torque are connected by a line 11 to the management computer 7.

The device of the invention preferably further comprises measuring means 13 for measuring the clogging of the filter F and detection means 15 for detecting rotation of the engine M transmitting data to the computer 7 via lines 17 and 19, respectively.

The device of the invention operates in the following manner.

The measuring means 13 for measuring the clogging of the filter F inform the computer 7 if they detect a degree of clogging necessitating the starting of a regeneration operation.

The computer 7 advantageously verifies that the following conditions a) and b) are satisfied before turning on the ceramic igniters 1:

a) The engine M is running, which enables renewal of the air in the filter F. If the air is not renewed, the combustion of the soot quickly stops.

The computer 7 is informed by the means 15 of the running or stopped state of the engine M.

b) The filter is warm, i.e. its temperature exceeds a minimum temperature.

The computer 7 preferably considers that this latter condition is satisfied when the engine M has just delivered an engine torque exceeding a predetermined top threshold $C_{top}$ for a predetermined time period, for example while the vehicle V is travelling a few kilometers.

The top threshold $C_{top}$ is preferably set to a value greater than or equal to 30% of the maximum engine torque $C_{max}$ that the engine M may provide.

The predetermined time period is preferably at least one minute.

According to the invention, when the two conditions a) and b) are satisfied, the computer 7 waits for a third condition c) to be satisfied, namely that the engine M is delivering an engine torque below a predetermined bottom threshold $C_{bottom}$.

The bottom threshold $C_{bottom}$ is preferably less than or equal to 10% of the maximum engine torque $C_{max}$.

The engine M delivers an engine torque below the bottom threshold $C_{bottom}$ in two main situations in particular: in the absence of combustion, and when idling.

The term "absence of combustion" (in the engine) refers to phases of operation of the engine during which no combustion occurs in any of the cylinders of the engine.

In a vehicle propelled by an internal combustion engine, these phases occur in particular when the injection of fuel is cut off because the driver of the vehicle ceases to depress the accelerator pedal 10. In a hybrid "thermal—electrical" vehicle, these phases may also occur when the electric motor is supplying all of the power for propelling the vehicle. For regenerating the filter F, it is nevertheless necessary to keep the thermal engine M running, to satisfy condition a).

The evaluation means 9 supply to the computer 7 an estimate of the motor torque delivered by the motor M as a function of the position of the accelerator pedal 10. This allows the computer 7 to determine when the engine M is delivering an engine torque below the bottom threshold $C_{bottom}$ or above the top threshold $C_{top}$.

The condition c), whereby the engine M must deliver an engine torque below the bottom threshold $C_{bottom}$, is required prior to turning on the ceramic igniters in order for the exhaust gases G coming from the engine M and entering the filter F to retain a high oxygen content, to encourage ignition of the soot present in the filter F and the propagation of combustion to all of the soot in the filter body.

As soon as possible after the condition c) is satisfied, and preferably within a maximum delay of one minute, the computer 7 causes the control means 5 to pass an ignition electrical current through the ceramic igniters 1.

In one variant of the invention, the computer 7 commands the turning on of the ceramic igniters 1 as soon as condition c) is satisfied, without necessarily checking the degree of clogging of the filter beforehand, or its temperature, or for rotation of the engine. This reduces the probability of ignition of the soot, but simplifies the architecture of the device.

The ceramic igniters 1 have a very short response time. Although standard spark plugs take from 10 to 40 seconds to reach 1000° C., the ceramic igniters 1 take only 3 to 6 seconds to achieve the same temperature. This is crucial since if heating is not fast enough, the soot tends to be consumed without igniting, rather than tending to ignite, which impedes the propagation of combustion.

The ceramic igniters 1 preferably have a rate of increase of temperature exceeding 150° C./s, more preferably greater than 200° C./s, and even more preferably greater than 300° C./s.

The ceramic igniters preferred for the invention are Mini-Igniters® from SAINT-GOBAIN ADVANCED CERAMICS, the characteristics of which are summarized in Table 1 below.

Given the voltages usually available in automobile vehicles, the 300 models operating at 12 volts and the 401 and 405 models operating at 24 volts are preferred.

The phases of operation of the engine during which it delivers an engine torque below the bottom threshold $C_{bottom}$ generally last a few seconds, for example the time taken by the vehicle V to slow down and stop. For these few seconds to be sufficient to turn on the heating means and ignite the soot, it is advantageous for those means to have a very short response time.

The ceramic igniters 1 are therefore particularly adapted to the management method of the invention, especially as they provide for positioning the hot tips within the filter body.

The computer 7 maintains the ignition electrical current through the ceramic igniters 1 for a predetermined time period, preferably at least 5 seconds.

The ignition electrical current is preferably maintained throughout this predetermined time period, even if in the meantime the engine torque supplied by the engine M again exceeds the bottom threshold $C_{bottom}$.

The method of the invention is advantageously applicable to any heating means, but especially heating means whose response time enables the soot to be ignited during a phase of absence of combustion, i.e. within a maximum time period of around 10 seconds in the case of a thermal vehicle.

The combustion of the soot continues until all of the soot has been consumed or the conditions for combustion are no longer satisfied. In the latter case, the soot is extinguished spontaneously.

Of course, the present invention is not limited to the embodiment described and shown by way of illustrative and nonlimiting example.

In particular, it is not limited to one particular type of filter. For example, it is applicable whether the filter F is catalytically assisted or not.

It also encompasses filters through which pass exhaust gases resulting from the combustion of a fuel to which one or more additives have been added, in particular an additive intended to catalyze the reaction of oxidation of the soot and/or to reduce its flashpoint.

Finally, any heating means having a hot tip whose temperature may be increased from room temperature of 20° C. to a temperature of 1000° C. or greater within 6 seconds from its nominal energization is suitable for implementing the invention.

TABLE 1

Preferred Mini-Igniters ®

| | Mini-Igniter ® model | | | | |
|---|---|---|---|---|---|
| | 300 | 401 | 601 | 405 | 600 |
| Time for temperature to increase to nominal temperature from room temperature | 3 s | 3 s | 5 s | <2 s | <6 s |
| Continuous electrical current | 1.5 to 2.5 A at 12 V | 1.0 to 2.2 A at 24 V | 0.4 to 1.2 A at 120 V | 0.4 to 0.6 A at 24 V | 0.2 to 0.75 A at 120 V |
| Electrical resistance at room temperature | 1.0 to 6.0 Ohms | 1.0 to 6.0 Ohms | 25 to 300 Ohms | 1 to 100 Ohms | 25 to 600 Ohms |
| Nominal temperature | from 1035 to 1580° C. | 1275 to 1455° C. at 24 V | 1275 to 1455° C. at 120 V | from 1050 to 1500° C. | 1150 to 1400° C. at 120 V |

The invention claimed is:

1. Method of backwashing by heating a particulate filter (F) for purifying exhaust gases (G) from an internal combustion engine (M), in particular an internal combustion engine equipping an automobile vehicle (V), wherein starting of a heating means (1) of the filter (F) is commanded when said engine (M) is delivering an engine torque below a predetermined bottom threshold ($C_{bottom}$), said heating means comprising at least one ceramic igniter adapted to heat, by direct contact, particles deposited on a filter body of said filter (F) and adapted to reach a temperature of 1000° C. within 3 to 6 seconds, wherein starting of said heating means (1) is commanded after said engine (N) has delivered an engine torque exceeding a top threshold ($C_{top}$) for at least a predetermined time period.

2. Method according to claim 1, wherein starting of said heating means (1) is commanded in the absence of combustion in said engine (M).

3. Method according to claim 1, wherein said bottom threshold ($C_{bottom}$) is less than or equal to 10% of the maximum engine torque ($C_{max}$) of said engine (M).

4. Method according to claim 1, wherein said top threshold ($C_{top}$) is greater than or equal to 30% of the maximum engine torque ($C_{max}$) of said engine (M).

5. Method according to claim 1, wherein said predetermined time period is greater than or equal to one minute.

6. Method according to claim 1, wherein starting of said heating means (1) is commanded after detection of a minimum mass of soot in said filter (F).

7. Method according to claim 1, wherein starting of said heating means (1) is commanded at the latest one minute after said engine (M) has begun to deliver an engine torque below said bottom threshold ($C_{bottom}$).

8. Method according to claim 1, wherein starting of said heating means (1) is commanded as soon as said engine (M) has begun to deliver an engine torque below said bottom threshold ($C_{bottom}$).

9. Method according to claim 1, wherein said heating means (1) are maintained in operation for at least five seconds after starting.

10. Method according to claim 1, wherein said engine torque delivered by said engine (M) is evaluated by measuring a position of an accelerator pedal (10).

11. Method according to claim 1, wherein starting of said heating means (1) is commanded when said engine (M) is idling.

12. Device for implementing the backwashing method of claim 2, said device comprising heating means (1) for heating said filter (F), control means (5) for controlling said heating means, and a computer (7) for managing said control means (5), said device further comprising detection means (9, 10) for detecting the delivery by said engine (M) of an engine torque below a predetermined bottom threshold ($C_{bottom}$), said computer (7) commanding starting of said heating means (1) in response to said detection, said heating means (1) comprising at least one ceramic igniter adapted to heat by direct contact particles deposited on a filter body of said filter (F) and able to reach a temperature of 1000° C. within 3 to 6 seconds.

13. Method according to claim 1, wherein said heating means (1) comprise a hot tip whose temperature increases from a temperature greater than or equal to 20° C. to a temperature greater than or equal to 1000° C. within six seconds of being started.

14. Method according to claim 13, wherein said heating means (1) comprise Mini-Igniter® type igniters.

15. Device for implementing the backwashing method of claim 1, said device comprising heating means (1) for heating said filter (F), control means (5) for controlling said heating means, and a computer (7) for managing said control means (5), said device further comprising detection means (9, 10) for detecting the delivery by said engine (M) of an engine torque below a predetermined bottom threshold ($C_{bottom}$), said computer (7) commanding starting of said heating means (1) in response to said detection, said heating means (1) comprising at least one ceramic igniter adapted to heat by direct contact particles deposited on a filter body of said filter (F) and able to reach a temperature of 1000° C. within 3 to 6 seconds.

16. Device according to claim 15, wherein hot tips of said heating means (1) are disposed inside said filter body or on an outside lateral surface (2) of said filter body, preferably without projecting from said surface (2).

17. Device according to claim 15, including detection means (15) for detecting rotation of said engine (M).

18. Method of backwashing by heating a particulate filter (F) for purifying exhaust gases (G) from an internal combustion engine (M), in particular an internal combustion engine equipping an automobile vehicle (V), wherein starting of a heating means (1) of the filter (F) is commanded when said engine (M) is delivering an engine torque below a predetermined bottom threshold ($C_{bottom}$), said heating means comprising at least one ceramic igniter adapted to heat, by direct contact, particles deposited on a filter body of said filter (F) and adapted to reach a temperature of 1000° C. within 3 to 6 seconds, wherein starting of said heating means (1) is commanded only if at least one of said filter (F) and said engine (M) are at temperatures exceeding respective threshold temperatures.

19. Device for implementing the backwashing method of claim 18, said device comprising heating means (1) for heating said filter (F), control means (5) for controlling said heating means, and a computer (7) for managing said control means (5), said device further comprising detection means (9, 10) for detecting the delivery by said engine (M) of an engine torque below a predetermined bottom threshold ($C_{bottom}$), said computer (7) commanding starting of said heating means (1) in response to said detection, said heating means (1) comprising at least one ceramic igniter adapted to heat by direct contact particles deposited on a filter body of said filter (F) and able to reach a temperature of 1000° C. within 3 to 6 seconds.

20. Method according to claim 18, wherein starting of said heating means (1) is commanded at the latest one minute after said engine (M) has begun to deliver an engine torque below said bottom threshold ($C_{bottom}$).

21. Method according to claim 18, wherein starting of said heating means (1) is commanded as soon as said engine (M) has begun to deliver an engine torque below said bottom threshold ($C_{bottom}$).

22. Method according to claim 18, wherein said heating means (1) comprise Mini-Igniter® type igniters.

* * * * *